(12) United States Patent
Ichihara et al.

(10) Patent No.: US 12,404,563 B2
(45) Date of Patent: Sep. 2, 2025

(54) LINEAR GROOVE FORMATION METHOD AND METHOD FOR PRODUCING GRAIN-ORIENTED ELECTRICAL STEEL SHEET

(71) Applicant: JFE STEEL CORPORATION, Tokyo (JP)

(72) Inventors: Yoshihisa Ichihara, Tokyo (JP); Takeshi Omura, Tokyo (JP); Hirotaka Inoue, Tokyo (JP); Shigehiro Takajo, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 891 days.

(21) Appl. No.: 17/630,853

(22) PCT Filed: Jul. 3, 2020

(86) PCT No.: PCT/JP2020/026182
§ 371 (c)(1),
(2) Date: Jan. 27, 2022

(87) PCT Pub. No.: WO2021/020027
PCT Pub. Date: Feb. 4, 2021

(65) Prior Publication Data
US 2022/0267872 A1 Aug. 25, 2022

(30) Foreign Application Priority Data

Jul. 31, 2019 (JP) ................... 2019-140969

(51) Int. Cl.
*C21D 8/12* (2006.01)
(52) U.S. Cl.
CPC ......... *C21D 8/1294* (2013.01); *C21D 8/1277* (2013.01); *C21D 2201/05* (2013.01)

(58) Field of Classification Search
CPC . C21D 8/1294; C21D 8/1277; C21D 2201/05
See application file for complete search history.

(56) References Cited

U.S. PATENT DOCUMENTS

| 2009/0145526 A1 | 6/2009 | Arai et al. |
| 2015/0145149 A1* | 5/2015 | Wachter ............... H01L 21/561 257/787 |

(Continued)

FOREIGN PATENT DOCUMENTS

| CN | 101171651 A | 4/2008 |
| JP | S62-86121 A | 4/1987 |

(Continued)

OTHER PUBLICATIONS

Nov. 6, 2023 Office Action issued in Korean Patent Application No. 10-2022-7003404.

(Continued)

*Primary Examiner* — Elizabeth M Kerr
*Assistant Examiner* — Keith Brian Assante
(74) *Attorney, Agent, or Firm* — Oliff PLC (57) ABSTRACT

A linear groove formation method including forming a coated resist on a surface of a steel sheet, irradiating two or more laser beams onto the surface of the steel sheet while scanning the laser beams in a direction intersecting the rolling direction of the steel sheet cyclically in a rolling direction of the steel sheet, and forming linear grooves by etching portions of the steel sheet. In the laser irradiating process, the coated resist is removed continuously in a sheet transverse direction of the steel sheet by using the laser beams irradiated from respective ones of two or more laser irradiation devices arranged in the sheet transverse direction, and the laser beams are irradiated by shifting centers of two (Continued)

of the laser beams irradiated from two of the laser two of the laser irradiation devices adjacent to each other in the sheet transverse direction.

8 Claims, 7 Drawing Sheets

(56) References Cited

U.S. PATENT DOCUMENTS

| | | | | |
|---|---|---|---|---|
| 2015/0174699 | A1* | 6/2015 | Bruck | B23K 26/359 |
| | | | | 219/121.66 |
| 2017/0348802 | A1* | 12/2017 | Kwon | B23K 26/064 |
| 2018/0066334 | A1 | 3/2018 | Mogi et al. | |
| 2018/0147663 | A1* | 5/2018 | Takajo | C23F 1/28 |
| 2019/0009370 | A1* | 1/2019 | Matthews | B23K 26/0846 |
| 2020/0087193 | A1* | 3/2020 | Abramov | C03B 33/0207 |

FOREIGN PATENT DOCUMENTS

| | | |
|---|---|---|
| JP | H06-22179 B2 | 3/1994 |
| JP | 2003-129135 A | 5/2003 |
| JP | 2012-077380 A | 4/2012 |
| JP | 2013072116 A | 4/2013 |
| JP | 2017-025377 A | 2/2017 |
| JP | 2020-090709 A | 6/2020 |
| WO | 2015045693 A1 | 4/2015 |
| WO | 2015/111434 A1 | 7/2015 |
| WO | 2016/129235 A1 | 8/2016 |
| WO | 2016/171129 A1 | 10/2016 |
| WO | 2017/017908 A1 | 2/2017 |
| WO | 2018/117672 A1 | 6/2018 |

OTHER PUBLICATIONS

Sep. 24, 2020 International Search Report issued in International Patent Application No. PCT/JP2020/026182.
Feb. 16, 2023 Office Action issued in Chinese Patent Application No. 202080055073.4.
Aug. 10, 2023 Office Action issued in Chinese Patent Application No. 202080055073.4.
Aug. 11, 2022 Extended Search Report issued in European Patent Application No. 20846730.8.

* cited by examiner

LINEAR GROOVE FORMATION METHOD AND METHOD FOR PRODUCING GRAIN-ORIENTED ELECTRICAL STEEL SHEET

TECHNICAL FIELD

This application relates to a linear groove formation method and a method for manufacturing a grain-oriented electrical steel sheet.

BACKGROUND ART

A grain-oriented electrical steel sheet is used as an iron core material for a transformer. The energy loss of a transformer is strongly affected by the iron loss of a grain-oriented electrical steel sheet. Nowadays, there is a strong demand for decreasing the energy loss of a transformer from the viewpoint of energy saving and environmental regulations. Since the iron loss of a transformer is affected by the iron loss of a grain-oriented electrical steel sheet, which is a material for the transformer, developing a grain-oriented electrical steel sheet having low iron loss is very important.

The iron loss of a grain-oriented electrical steel sheet is divided into hysteresis loss and eddy-current loss. Examples of a method developed for improving hysteresis loss include a method that the (110)[001] orientation, which is called GOSS orientation, is highly oriented in the rolling direction and a method that the amounts of impurities contained in a steel sheet are decreased. On the other hand, examples of a method developed for improving eddy-current loss include a method that electrical resistance is increased by adding Si and a method that film tension is applied in the rolling direction. However, these methods are of limited effectiveness for further improving iron loss in a manufacturing process.

Therefore, a magnetic domain refining technique has been developed which provides the non-uniformity of magnetic flux density by using a physical method such as a method that grooves are formed or local strain is applied after a steel sheet has been subjected to finish annealing followed by baking of an insulation coating film. This technique is a method that iron loss and, in particular, eddy-current loss are decreased by segmentalizing the width of a 180° magnetic domain (main magnetic domain), which is formed in the rolling direction.

A type of such a magnetic domain refining technique that there is no decrease in the effect of the technique even after the product sheet has been subjected to stress-relief annealing, is particularly called a heat-resistant magnetic domain refining method. Such a method is generally used for a material for a wound iron core, which is indispensably subjected to stress-relief annealing in a manufacturing process. For example, Patent Literature 1 proposes a technique that iron loss, which is originally 0.80 W/kg or more in terms of $W_{17/50}$, is decreased to 0.70 W/kg or less after linear grooves having a width of 300 μm or less and a depth of 100 μm or less have been formed on a steel sheet surface.

Examples of a method proposed for forming grooves on a grain-oriented electrical steel sheet include an electroetching method (Patent Literature 2), in which grooves are formed on the steel sheet surface by performing electroetching, a laser method (Patent Literature 3), in which the steel sheet is locally melted and evaporated by using a high-power laser, and a gear pressing method (Patent Literature 4), in which indentations are produced by pressing a gear-shaped roll onto the steel sheet.

Of such methods, the gear pressing method has a problem in productivity, since severe abrasion occurs in the roll and frequent maintenance is indispensable. Moreover, since minute projection portions are formed in the vicinity of the indentations when the indentations are produced on the steel sheet surface, there is a disadvantage that lamination factor tends to be decreased. Frequent maintenance is indispensable as well the laser method, since there is a deterioration in beam quality due to generated metallic vapor adhering to a beam path. In addition, since a melt-solidification portion is formed at the end of the formed groove, there is a decrease in lamination factor.

In contrast to such methods, an electroetching method where, after forming a resist pattern corresponding to a groove shape to be formed on a steel strip surface, non-resisted portions are removed through electroetching, it is possible to improve the problems of mechanical abrasion and a decrease in lamination factor.

Incidentally, it is known that the effect of improving iron loss due to the formation of such linear grooves is strongly affected by the shape of the grooves (groove shape). It is also known that the meaning of such an expression "groove shape" includes not only the width and depth of the groove but also detailed factors such as the curvature of the groove section. Therefore, also in the case of an electroetching method, there is a variation in the shape of the linear grooves due to a variation in the shape of the resist pattern, which results in a variation in the properties of a product. For example, in the case that a resist pattern is formed by performing gravure offset printing as described in Patent Literature 2, it is known that, since there is a variation in the spread of a resist ink due to a variation in the viscosity of the resist ink and due to a variation in the shapes of gravure cells, defects such as white spots and groove breaks occur. As a result, a deterioration in magnetic properties occur.

As a method for suppressing a variation in the resist pattern described above, Patent Literature 5 proposes a method in which patterning is performed by coating a resist ink across a whole steel sheet surface to form a coated resist and by thereafter irradiating the steel sheet surface with a laser beam to remove the coated resist in the portion irradiated with the laser beam (resist removing method). It is known that, in the case of a resist removing method, it is possible to form a more advantageous groove shape for improving magnetic properties than in the case of a gravure offset printing method.

CITATION LIST

Patent Literature

PTL 1: Japanese Examined Patent Application Publication No. 6-22179
PTL 2: Japanese Unexamined Patent Application Publication No. 2012-77380
PTL 3: Japanese Unexamined Patent Application Publication No. 2003-129135
PTL 4: Japanese Unexamined Patent Application Publication No. 62-86121
PTL 5: Japanese Unexamined Patent Application Publication No. 2017-25377
PTL 6: International Publication No. WO2016/171129

SUMMARY

Technical Problem

Generally, it is known that the effect of magnetic domain refining due to grooves increases with an increase in the surface area of the groove side walls of the steel sheet. However, when the depth of the grooves in the sheet thickness direction increases, a volume of groove increases and the magnetic properties of the steel sheet such as magnetic permeability decreases. Further, disadvantages in a production process such as breakage occurring when the steel sheet passes through a production line increase. Therefore, in the case of a material in the related art with magnetic domains refined by using grooves, consideration is given to increasing the effect of improving iron loss by optimizing a groove forming pattern. For example, Patent Literature 6 proposes a method in which plural linear groove groups are formed on a steel sheet surface and linear grooves adjacent to each other in the linear groove forming direction are arranged such that a space is provided between the edges thereof or such that the grooves overlap each other on a projection plane in a direction perpendicular to the rolling direction.

However, in the case of the method described above, when the linear grooves adjacent to each other are arranged such that the grooves overlap each other on a projection plane in a direction perpendicular to the rolling direction, although it is possible to realize an increased effect of magnetic domain refining, the total volume of the grooves increases and magnetic permeability decreases. In addition, when a space is provided between the edges of adjacent linear grooves, although it is possible to prevent a deterioration in magnetic properties due to a deterioration in magnetic permeability, there is a problem of an insufficient effect of magnetic domain refining.

Therefore, to develop a higher-performance material with heat-resistant refined magnetic domains, a groove forming pattern for realizing not only a large effect of magnetic domain refining but also high magnetic flux density is necessary.

The present disclosure has been completed in view of the situation described above. An object of the present application is to provide a linear groove formation method for forming linear grooves on a surface of a steel sheet and, in particular, a grain-oriented electrical steel sheet. The method for forming linear grooves is excellent in terms of the effect of improving iron loss and in terms of magnetic flux density.

Solution to Problem

The present inventors diligently conducted investigations to solve the problems described above.

First, investigations regarding the shape of grooves formed on a grain-oriented electrical steel sheet (hereinafter, also simply referred to as "steel sheet") were conducted. As described above, when grooves are formed on a steel sheet, there is a deterioration in magnetic permeability. Since the degree of such a deterioration in magnetic permeability correlates with the volume of the grooves, it is preferable that the volume of formed grooves be as small as possible. Therefore, regarding the shape of grooves formed on a steel sheet, it is considered that forming grooves such that each groove is formed continuously in the sheet transverse direction, that is, without discontinuity in the sheet transverse direction, is more preferable than forming and arranging linear groove groups on the surface of a steel sheet such that the linear grooves adjacent to each other overlap each other on a projection plane in a direction perpendicular to the rolling direction. On the other hand, the effect of improving iron loss due to the grooves formed in such a manner is less than that in the above-described case that small-scale linear groove groups are formed and the linear grooves adjacent to each other are arranged such that the grooves overlap each other on a projection plane in a direction perpendicular to the rolling direction. This is because the effect of magnetic domain refining increases with an increase in the surface area of discontinuous portions of magnetization, that is, the grooves.

Therefore, the present inventors diligently conducted additional investigations regarding a method for further improving iron loss in the case of grooves formed continuously in the sheet transverse direction.

In the case that only one groove forming mechanism is used when linear grooves are formed on a steel sheet, there is an insufficient processing capacity, which results in restriction of a manufacturing line speed. Therefore, linear grooves are generally formed by using plural groove forming mechanisms.

Figure 1:
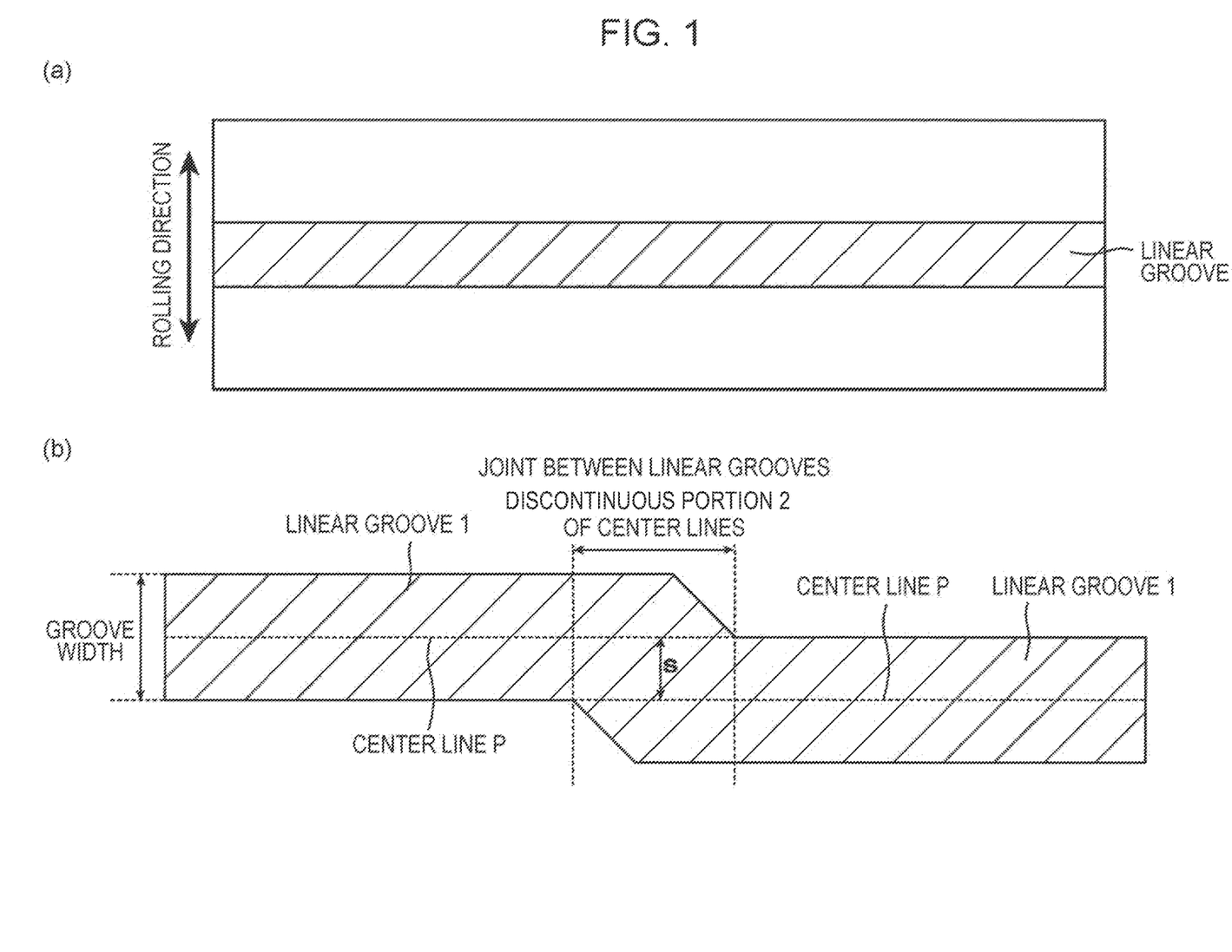
FIG. 1(a) is a diagram illustrating the shape of a linear groove formed continuously in a direction intersecting the rolling direction of a grain-oriented electrical steel sheet.
FIG. 1(b) is a diagram illustrating the shape of a linear groove 1 having a discontinuous portion 2 of center lines.

Therefore, in the case that a linear groove is formed continuously in a direction intersecting the rolling direction of a steel sheet as illustrated in FIG. 1(a), a joint exists between plural linear grooves as illustrated in FIG. 1(b). Relative positions of lines each of which passes through the central positions of the length (groove width) in the rolling direction of each of the linear grooves and is parallel to the groove forming direction (a center line P of a linear groove) at the joint were varied. It was found that, in the case that the positions of the center lines P are different (the center lines P are shifted), it is possible to realize a larger effect of improving iron loss than in the case that the positions are identical (the center lines P are collinear).

Although the detailed principle of this knowledge is not clear, the present inventors presume that this occurs due to the following mechanism.

A grain-oriented electrical steel sheet on which grooves have been formed is subjected to final annealing after an annealing separator is coated to the grooved steel sheet. This final annealing is performed for the purpose of the secondary recrystallization of the steel sheet and the formation of a forsterite coating film, and the forsterite coating film is also formed at the bottom of the groove. In addition, it is known that, in the case that such a forsterite coating film is densely formed, there is an improvement in iron loss due to an increase in the film tension. Therefore, linear grooves are formed such that, as illustrated in FIG. 1(b), at least one portion in which center lines P are parallel to each other and non-collinear (a region in which parallel center lines exist or a discontinuous portion of center lines) is formed in each of the linear grooves. Subsequently, an annealing separator containing mainly MgO is coated to the steel strip surface and the steel strip is wound into a coil. Thereafter, final annealing is performed for the purpose of the secondary recrystallization of the steel sheet and the formation of a forsterite coating film. At this time, an atmosphere gas stagnates in the discontinuous portion of center lines of the linear groove described above. It is presumed that, since a dense forsterite coating film is formed due to such stagnation of the atmosphere gas, there is an improvement in iron loss.

On the other hand, it was not possible to confirm the same effect when the flow rate of the atmosphere gas of the final annealing was decreased in the case that the relative positions of the center lines P of a linear groove were identical (the center lines P are collinear). This is considered to be because, since the flowability of the atmosphere gas was high due to the groove having a straight-line shape, a reaction for forming a forsterite coating film was not promoted.

Subsequently, the present inventors conducted investigations regarding the most suitable method for forming a groove having such a discontinuous portion of center lines. An electroetching method was used as a groove formation method from the viewpoint of productivity and lamination factor. In addition, regarding a method for forming a resist pattern, as a result of comparison among a gravure printing method, an ink-jet printing method, and a resist removing method from the viewpoint of satisfactory shape of a groove, a resist removing method, with which the largest effect of improving iron loss was realized, was selected. As a result of investigations regarding a method for forming a resist pattern to obtain the linear groove having the shape described above by using the combination of a resist removing method described above and an electroetching method, the following knowledge was obtained.

(1) By using a laser beam having a spot diameter of 0 that is irradiated from each of two or more laser irradiation devices arranged in the sheet transverse direction of the steel sheet, coated resist formed on the steel sheet surface is removed such that each of the devices covers a corresponding one of the divisions arranged continuously in the sheet transverse direction. At this time, centers of two laser beams, each irradiated from a corresponding one of the two adjacent laser irradiation devices, is shifted with a distance in the rolling direction of $\Phi$ multiplied by 0.05 or more and 0.95 or less. Subsequently, by performing electroetching, it is possible to form a linear groove having a discontinuous portion of center lines that stagnates an atmosphere gas during the final annealing.

Figure 2:
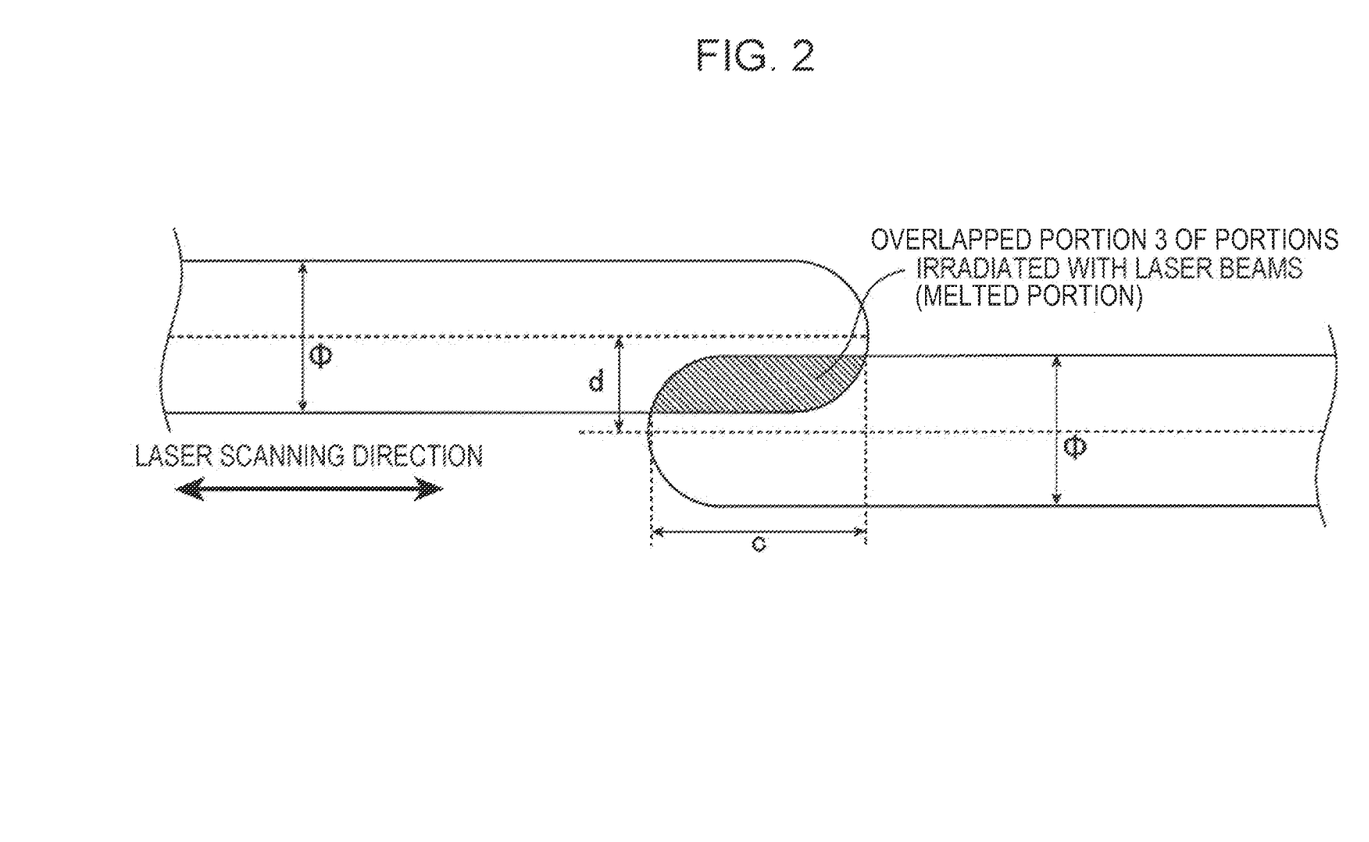
FIG. 2 is a diagram illustrating a melted portion formed in an overlapped portion 3 of portions irradiated with laser beams on a steel sheet surface.

(2) In the case of a resist removing method, as illustrated in FIG. 2, a melted portion is formed in a region in which portions irradiated with two adjacent laser beams overlap each other (hereinafter, also referred to as "overlap portion of laser beam irradiated portions"). After electroetching is performed, the groove depth of the melted portion is less than that of a non-melted portion. Therefore, the flowability of an atmosphere gas in the final annealing in a discontinuous portion of center lines decreases compared with the case of a gravure printing method and an ink-jet printing method. Therefore, it is possible to realize a larger effect of improving iron loss by using a resist removing method compared with other methods.

(3) Due to the effects described in items (1) and (2) above, it is possible to realize a larger effect of improving iron loss than in the case of a groove pattern formed by a gravure printing method or the like.

(4) Since the volume of a portion to be subjected to etching increases with an increase in the length in the laser scanning direction of the overlapped portion of the laser beams irradiated portions irradiated with two adjacent lasers. Therefore, it is preferable that the length in the laser scanning direction of the above-described overlapped portion be 50 mm or less.

(5) Since higher laser irradiation energy is more advantageous for removing a coated resist and forming a melted portion, it is preferable that the irradiation energy be as high as possible. However, in the case that the irradiation energy is excessively high, there is a risk of generation of spatter and damaging surrounding resist. Therefore, it is preferable that the irradiation energy is 30 J/m or less. On the other hand, in the case that the irradiation energy is lower than 1 J/m, there is a risk in that it is not possible to completely remove the coated resist from the portion irradiated with the laser beam. Therefore, it is preferable that the laser irradiation energy is 1 J/m or more and 30 J/m or less.

Since energy density increases with a decrease in the spot diameter $\Phi$ of a laser beam, a small spot diameter is advantageous for removing a coated resist and forming a melted portion. However, in the case that the spot diameter $\Phi$ is excessively small, there is a risk that a surrounding resist is damaged by spatter. Therefore, it is preferable that the spot diameter $\Phi$ of a laser beam is 1 μm or more. On the other hand, an increase in the spot diameter $\Phi$ of a laser beam decreases the energy density. In the case that the spot diameter $\Phi$ of a laser beam is more than 100 μm, there is a risk that it is not possible to completely remove the coated resist from the laser beam irradiated portion. Therefore, it is preferable that the spot diameter $\Phi$ of a laser beam is 1 μm or more and 100 μm or less.

On the basis of the knowledge described above, detailed investigations were conducted regarding conditions for forming a resist pattern, which led to the completion of the present disclosure.

Embodiments of the present disclosure are described below.

[1] A linear groove formation method which includes:
  a resist forming process of forming a coated resist on a surface of a steel sheet,
  a laser irradiating process of irradiating two or more laser beams onto the surface of the steel sheet while scanning the laser beams in a direction intersecting an rolling direction of the steel sheet cyclically in the rolling direction of the steel sheet to remove the coated resist from portions irradiated with the laser beams, and
  an etching process of forming linear grooves by etching portions of the steel sheet from which the coated resist has been removed,
  in which, in the laser irradiating process:
  the coated resist is removed continuously in a sheet transverse direction of the steel sheet by using the two or more laser beams irradiated from respective ones of two or more laser irradiation devices arranged in the sheet transverse direction; and
  when a spot diameter of the laser beams is defined as $\Phi$, the laser beams are irradiated by shifting centers of two of the laser beams irradiated from two of the laser irradiations devices adjacent to each other in the sheet transverse direction by $\Phi$ multiplied by 0.05 or more and 0.95 or less in a direction perpendicular to a laser scanning direction.

[2] The linear groove formation method according to item [1], in which a length in the laser scanning direction of an overlapped portion of portions irradiated with the two of the laser beams is 50 mm or less.

[3] The linear groove formation method according to item [1] or [2], in which the spot diameter $\Phi$ of the laser beams is 1 μm or more and 100 μm or less, and an irradiation energy of the laser beams is 1 J/m or more and 30 J/m or less.

[4] A method for manufacturing a grain-oriented electrical steel sheet, which includes forming linear grooves on a surface of a grain-oriented electrical steel sheet by using the linear groove formation method according to any one of items [1] to [3].

Advantageous Effects

According to the present disclosure, it is possible to provide a linear groove formation method for forming linear grooves on the surface of a steel sheet such as a grain-oriented electrical steel sheet excellent in terms of the effect of improving iron loss and in terms of magnetic flux density.

According to the method for manufacturing a grain-oriented electrical steel sheet disclosed herein, it is possible to realize an excellent effect of improving iron loss while suppressing a deterioration in the magnetic flux density of the grain-oriented electrical steel sheet. The grain-oriented electrical steel sheet manufactured by using the manufacturing method according to the present disclosure can preferably be used as a material for an iron core for a transformer and the like and, in particular, a material for a wound iron core.

DESCRIPTION OF EMBODIMENTS

First, experimental results which have led to the completion of the present disclosure will be described.

First, investigations were conducted regarding a resist pattern forming method for forming grooves by performing electroetching. By performing electroetching on a resist pattern formed by using each of a resist removing method, a gravure printing method, and an ink-jet printing method, grooves having a discontinuous portion 2 of center lines as illustrated in FIG. 1(b) were formed across the whole surface of a cold rolled steel strip for a grain-oriented electrical steel sheet. At this time, each of the shift amount between center lines P in the discontinuous portion 2 of center lines (distance in the groove width direction between the center lines P in the discontinuous portion 2 of center lines, i.e., s in FIG. 1(b)), the length in the groove forming direction of the discontinuous portion 2 of center lines, and the groove depth (the depth in the sheet thickness direction of the groove) was set to have a constant value.

After the linear grooves 1 were formed as described above, the coated resist remaining on the surface was stripped in an alkaline solution, decarburization annealing was performed, an annealing separator containing mainly MgO was coated to the annealed steel strip, and the steel strip was wound into a coil. Thereafter, final annealing was performed. After flattening annealing was performed on the steel strip subjected to the final annealing, a tension coating was formed on the steel strip surface to obtain a final product steel strip. Steel sheets each having a length in the sheet transverse direction of 100 mm and a length in the rolling direction of 280 mm were taken from the obtained steel strip, and magnetic properties were evaluated. For the evaluation of the magnetic properties of the steel sheet, iron loss $W_{17/50}$ and magnetic flux density $B_8$ were used. The expression "$W_{17/50}$" denotes iron loss when alternating magnetization of 1.7 T and 50 Hz is performed in the rolling direction of the steel sheet, and the expression "$B_8$" denotes magnetic flux density when magnetization is performed in the rolling direction with a magnetizing force of 800 A/m.

Iron loss $W_{17/50}$ and $B_8$ obtained by using each of the resist pattern forming methods are given in Table 1. It was clarified that a resist removing method provided the largest effect of improving iron loss. The reason for this is considered to be as follows. In the case of a resist removing method, since a melted portion as illustrated in FIG. 2 was formed when removing a coated resist from a steel sheet by using laser beams, the groove depth in such a portion after the electroetching was smaller than that of other portions. As a result, since there was a decrease in the sectional area of a flow channel of an atmosphere gas in the final annealing in the discontinuous portion 2 of center lines, there was a decrease in the flowability of the gas compared with the case of other methods. As a result, it is considered that, a denser forsterite coating film was formed and a large effect of improving iron loss was realized. On the other hand, the effect of improving iron loss of a gravure printing method was smaller than that of the other methods, and there was also a decrease in $B_8$, i.e., magnetic permeability. This was caused by groove breaks and white spots described above.

TABLE 1

| No. | Resist Pattern Forming Method | Iron Loss $W_{17/50}$ [W/kg] | $B_8$ [T] |
|---|---|---|---|
| 1 | Resist Peeling Method | 0.690 | 1.930 |
| 2 | Ink-jet Printing Method | 0.700 | 1.930 |
| 3 | Gravure Printing Method | 0.710 | 1.920 |

Second, after having formed a coated resist by coating a resist ink across the whole surface of a cold rolled steel strip for a grain-oriented electrical steel sheet, resist patterns were formed by using two laser beams irradiated from two adjacent laser irradiation devices arranged in the strip transverse direction of the cold rolled steel strip. At this time, centers of the two adjacent laser beams having a laser spot diameter of Φ were shifted with each other in a direction perpendicular to the laser scanning direction. A coated resist was removed with various distances in the direction perpendicular to the laser scanning direction between the centers of the two laser beams (hereinafter, also referred to as "light path shifting distance d" (refer to FIG. 2)). Thereafter, electroetching were performed to form grooves while adjusting electrolytic conditions so that the groove depth had a constant value. At this time, the laser spot diameter Φ was 100 μm, and the irradiation energy was 20 J/m. In addition, a length in the laser scanning direction of an overlapped portion 3 of portions irradiated with two adjacent laser beams (hereinafter, also referred to as "light path overlap length c" (refer to FIG. 2)) was set to have a constant value of 10 mm. Here, in the present disclosure embodiments, the laser spot diameter Φ is defined as the full-width at half maximum in the strength profile of a laser beam. In addition, the laser spot diameter Φ is set to be a spot diameter in a direction perpendicular to the laser scanning direction.

Figure 3:
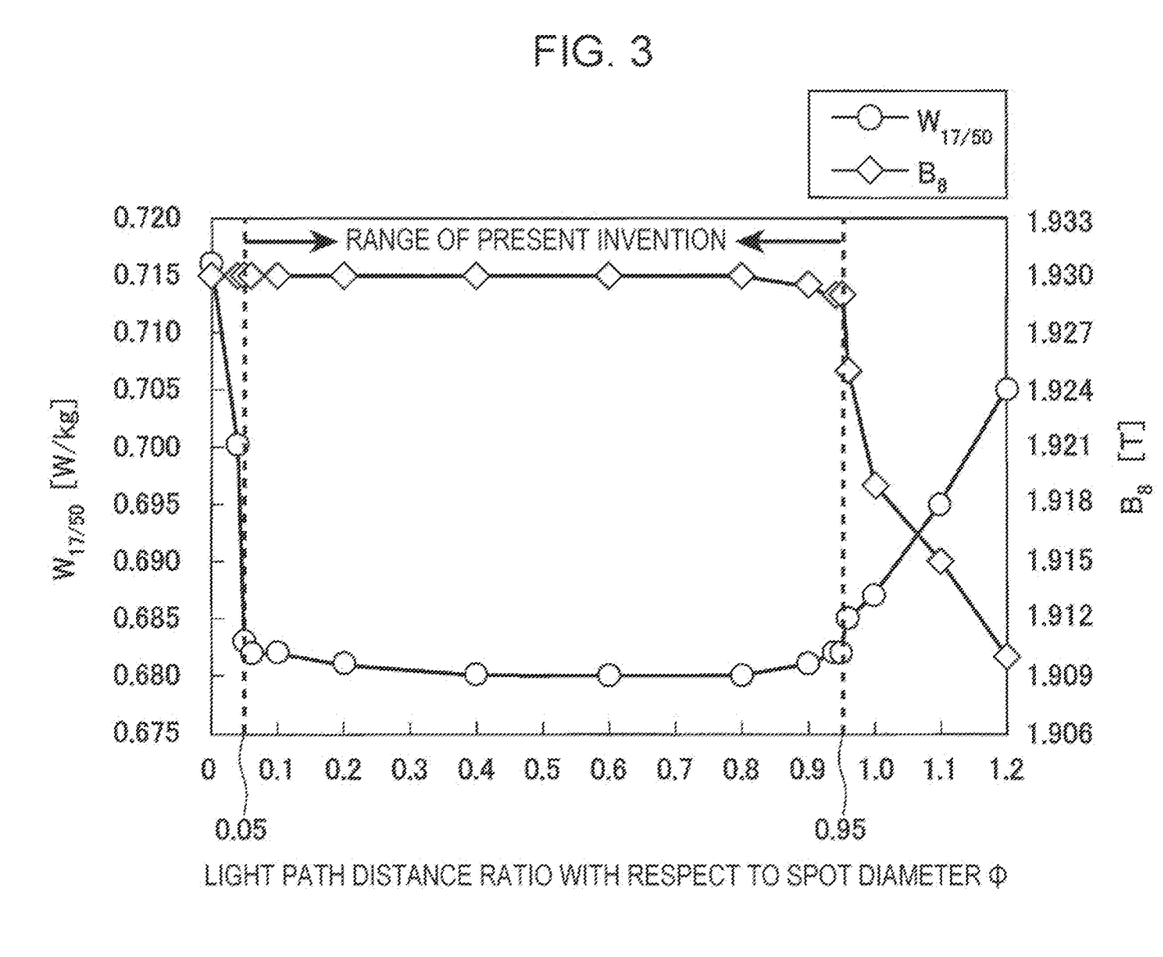
FIG. 3 is a graph illustrating the relationship between a light path shift ratio and iron loss.

After having performed decarburization annealing on a cold rolled steel strip for a grain-oriented electrical steel sheet subjected to the formation of linear grooves as described above followed by stripping of the coated resist remaining on the surface in an alkaline solution, a final product steel strip was obtained by performing the processes described above. Steel sheets each having a certain SST size, that is, a length in the sheet transverse direction of 100 mm and a length in the rolling direction of 280 mm, were taken from the obtained steel strip, and $W_{17/50}$ and $B_8$ were evaluated. The results are given in FIG. 3. Here, the expression "light path shift ratio with respect to spot diameter $\Phi$" in FIG. 3 denotes the ratio of the light path shift distance d to the spot diameter $\Phi$. As illustrated in FIG. 3, it was clarified that, in the case that the light path shift ratio was 0.05 or more, there was a large effect of improving iron loss. This is considered to be because, when final annealing was performed after wounding the steel strip into a coil, a flow of an atmosphere gas in final annealing, which flowed along linear grooves formed continuously in the strip transverse direction, is stagnated in the discontinuous portion of center lines. As a result, a reaction for forming a forsterite coating film was promoted, which resulted in a dense microstructure being formed. In addition, in the case that the light path shift ratio was 1.0 or more, that is, the groove did not have a continuous straight-line shape, there was a significant decrease in the effect of improving iron loss. This is considered to be because, since the groove did not have a continuous straight-line shape, the flow of the atmosphere gas was blocked. As a result, the effect described above was not realized.

On the other hand, it was clarified that there was a tendency for deteriorating magnetic flux density (BO when the light path shift ratio was more than 0.95. This is considered to be because the volume removed by performing etching increases due to an increase in light path shift distance d and the magnetic permeability of the steel sheet decreases.

From the results described above, the appropriate range of the light path shift ratio is set to be 0.05 or more and 0.95 or less. That is, when the laser spot diameter is defined as $\Phi$, the shift distance in a direction perpendicular to the laser scanning direction between the centers of two laser beams emitted from the two laser irradiation devices adjacent to each other in the sheet transverse direction is set to be $\Phi$ multiplied by 0.05 or more and 0.95 or less. It is more preferable that the light path distance ratio described above is 0.10 or more. In addition, it is more preferable that the light path shift ratio is 0.90 or less.

Figure 4:
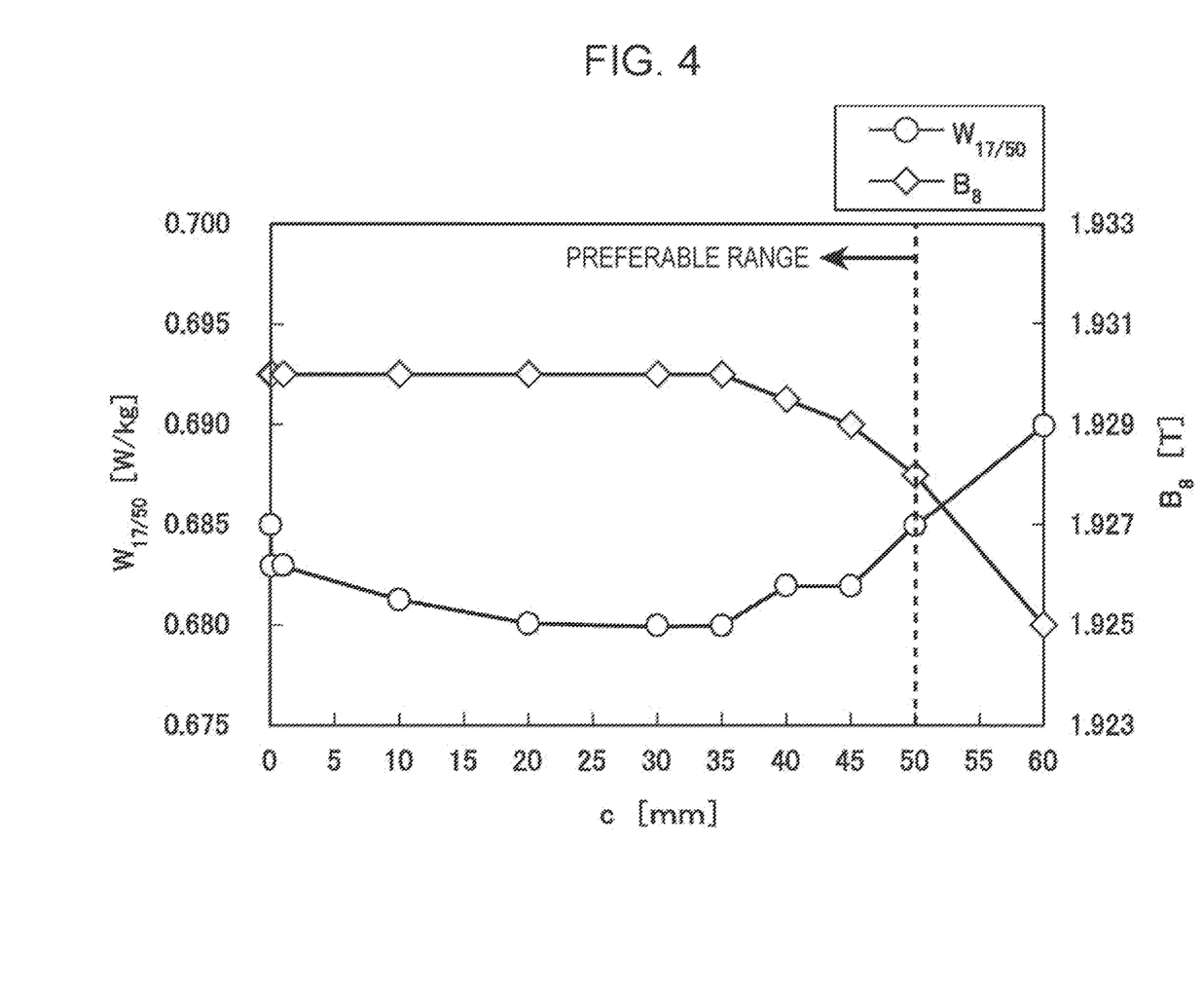
FIG. 4 is a graph illustrating the relationship between a light path overlap length c and iron loss.

Third, while each of the laser spot diameter $\Phi$, the light path shift distance d, and the groove depth was set to have a constant value, final product steel strip having various light path overlap lengths c were manufactured by performing the same processes as described above. Steel sheets each having the same size as described above were taken from each the obtained steel strip, and magnetic properties were investigated. The results are given in FIG. 4. It was clarified that, in the case that the light path overlap length c was 50 mm or less, there was a large effect of improving iron loss. This is considered to be because, as in the case described above, a dense forsterite coating film was formed due to an atmosphere gas stagnating in the discontinuous portion 2 of center lines. On the other hand, it was clarified that, in the case that the light path overlap length c was more than 50 mm, there was a decrease in the effect of improving iron loss. This is considered to be because, since there was an improvement in the flowability of the atmosphere gas due to an increase in light path overlap length c, it was difficult to form a dense forsterite coating film. Moreover, in the case that the light path overlap length c was more than 50 mm, it was also clarified that there was a deterioration in $B_8$. This is considered to be because there was an increase in the volume of the groove due to an increase in light path overlap length c. From the results described above, it is preferable that the light path overlap length c is 50 mm or less. Here, from the viewpoint of forming a continuous linear groove, the light path overlap length c is set to be 0 mm or more. It is preferable that the light path overlap length c is 0.1 mm or more. In addition, it is more preferable that the light path overlap length c is 40 mm or less.

Fourth, appropriate conditions for laser beam irradiation were investigated. A resist ink was coated across the whole surface of a cold rolled steel sheet for a grain-oriented electrical steel sheet whose weight had been measured, a linear resist pattern was formed by using one laser beam irradiated from one laser irradiation device, and electroetching was performed. At this time, electrolytic conditions were controlled so that the depth of the linear grooves formed by the electroetching had a constant value. After having stripped the coated resist remaining on the steel sheet subjected to electroetching, the weight of the steel sheet was measured, and a decrease in the weight of the steel sheet due to electroetching (weight loss) was calculated. By using a value obtained by dividing this weight loss by the weight calculated from the groove width, the groove depth, and the number of linear grooves, that is, a weight loss ratio as an index, appropriate conditions for the laser irradiation were investigated. Here, when the weight loss ratio approaches to 1.0, there is a decrease in the degree of groove shape defects such as groove breaks and white spots. Laser irradiation was performed (1) under the conditions of a spot diameter $\Phi$ of 100 μm and an irradiation energy of 0.5 J/m to 35 J/m and (2) under the conditions of an irradiation energy of 20 J/m and a spot diameter $\Phi$ of 0.5 μm to 120 μm. Here, the irradiation energy was expressed in units of energy per unit scanning length ((laser power (W))/(scanning speed (m/sec))).

Figure 5:
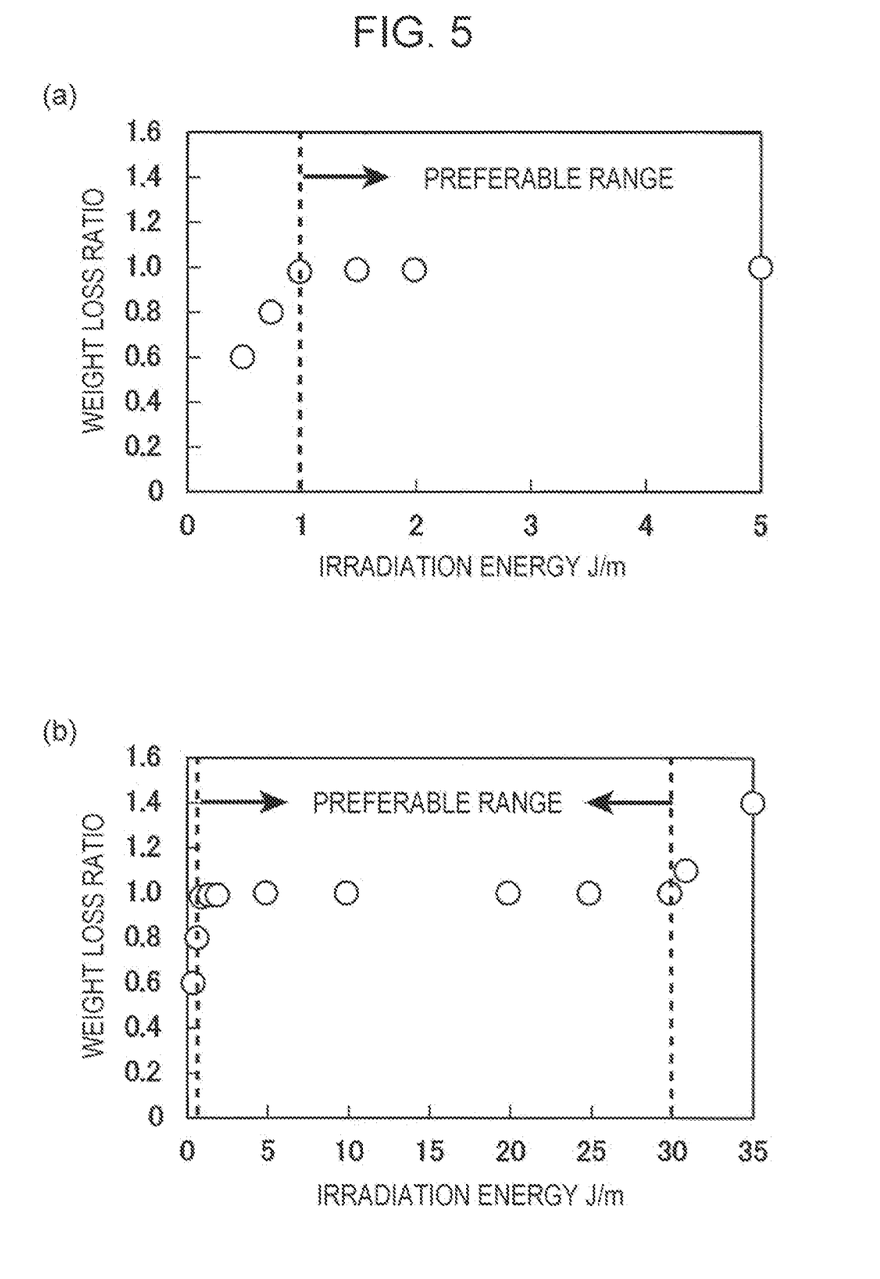
FIG. 5 is graphs illustrating the relationship between irradiation energy and a weight loss ratio.

The results of (1) are given in FIG. 5. It was clarified that, in the case that the irradiation energy was less than 1 J/m, the weight loss ratio was notably less than 1.0 (refer to FIG. 5(a)). This is considered to be because, since a coated resist was not sufficiently removed, there was a decrease in the area of electrolytic regions where an electrolytic reaction occurred. On the other hand, it was clarified that, in the case that the irradiation energy was more than 30 J/m, there was a tendency for the weight loss ratio to be more than 1.0 (refer to FIG. 5(b)). This is considered to be because, since a surrounding coated resist was damaged due to scattering of spatters from the steel sheet due to an increase in irradiation energy, an electrolytic reaction progressed also in regions other than the linear grooves, which resulted in generation of white spots. Since a decrease in the area of electrolytic regions and the generation of white spots described above cause a deterioration in iron loss, and since white spots also causes a deterioration in magnetic permeability, these phenomena are not preferable. From the results described above, it is preferable that the irradiation energy is 1 J/m or more and 30 J/m or less.

Figure 6:
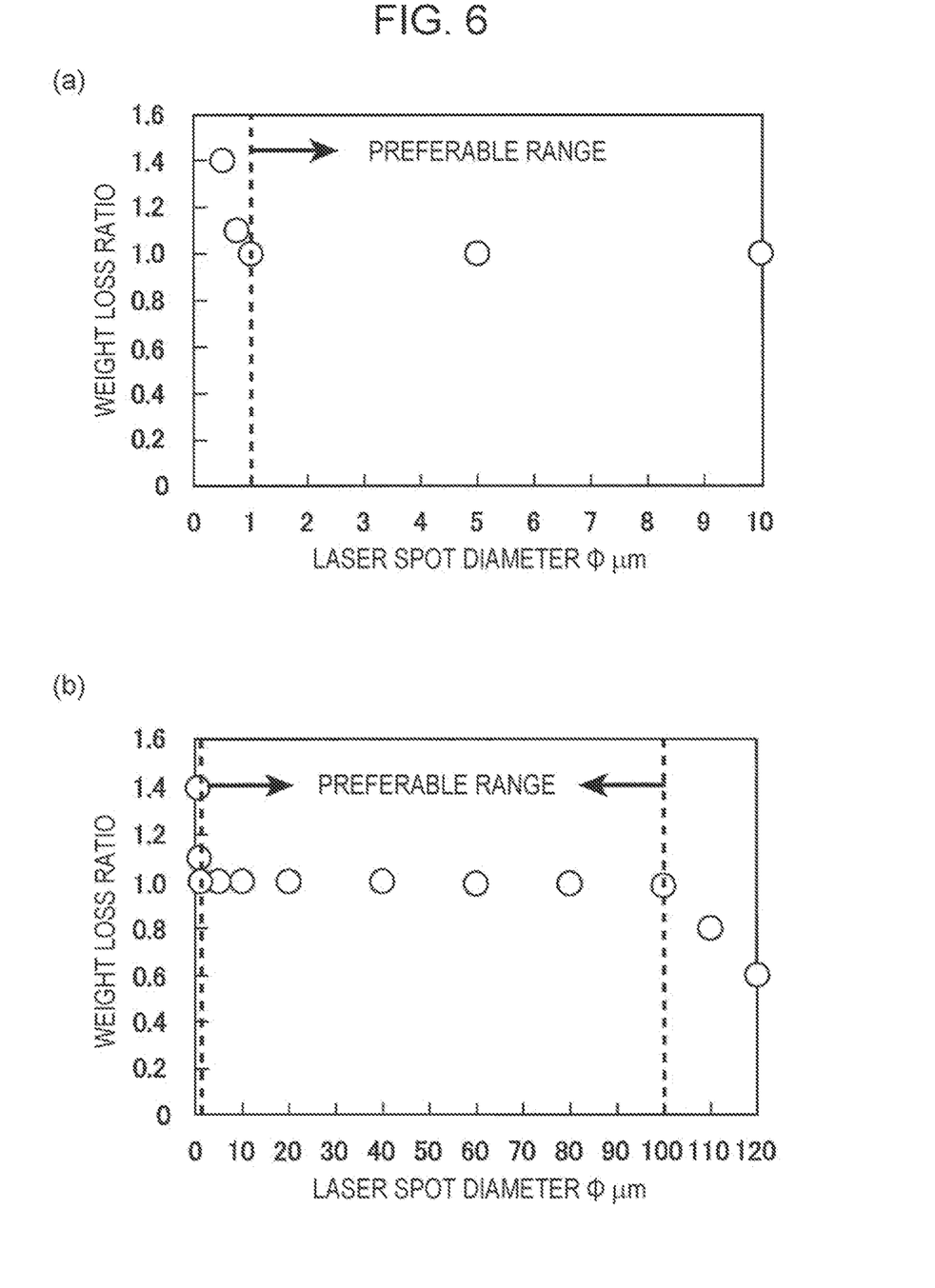
FIG. 6 is graphs illustrating the relationship between a laser spot diameter and a weight loss ratio.

Next, the results of (2) are given in FIG. 6. It was clarified that, in the case that the laser spot diameter $\Phi$ was less than 1 μm, there was a tendency for the weight loss ratio to be more than 1.0 (refer to FIG. 6(a)). This is considered to be because, since a surrounding coated resist was damaged due to scattering of spatters from the steel sheet due to an increase in energy density, an electrolytic reaction progressed also in regions other than the linear grooves, which resulted in generation of white spots. On the other hand, it was clarified that, in the case that the laser spot diameter $\Phi$ was more than 100 μm, the weight loss ratio was notably less than 1.0 (refer to FIG. 6(b)). This is considered to be because, since a coated resist was not sufficiently removed due to a decrease in energy density, there was a decrease in the area of electrolytic regions where an electrolytic reaction occurred. Since a decrease in the area of electrolytic regions and the generation of white spots described above cause a deterioration in iron loss, and since white spots also causes a deterioration in magnetic permeability, these phenomena are not preferable. From the results described above, it is preferable that the laser spot diameter Φ is 1 μm or more and 100 μm or less.

Hereafter, preferable embodiments of the present application will be described in detail. However, the present disclosure is not limited to the constitutions disclosed in the embodiments, and the present disclosure may be performed by making various alterations within a range in accordance with the intent of the present application.

[Grain-Oriented Electrical Steel Sheet]

The basic constituents, inhibitor constituents, optional constituents, and manufacturing processes of the steel material (slab) for the grain-oriented electrical steel sheet to which the present disclosed embodiments is applied will be described in detail.

(Basic Constituents)

C: 0.08 Mass % or Less

Although C is added to improve the microstructure of a hot rolled steel sheet, in the case that the C content is more than 0.08 mass %, it is difficult to decrease the C content through decarburization to a C content of 50 mass ppm or less, with which magnetic aging does not occur in manufacturing processes. Therefore, it is preferable that the C content is 0.08 mass % or less. In addition, since secondary recrystallization occurs even in a steel material which does not contain C, there is no particular limitation on the lower limit of the C content.

Si: 2.0 Mass % to 8.0 Mass %

Si is an element effective for improving iron loss by increasing the electrical resistance of steel. However, in the case that the Si content is less than 2.0 mass %, it is not possible to sufficiently realize such an effect of improvement. On the other hand, in the case that the Si content is more than 8.0 mass %, there is a marked deterioration in workability and sheet passage, and there is a decrease in magnetic flux density. Therefore, it is preferable that the Si content is 2.0 mass % to 8.0 mass %.

Mn: 0.005 Mass % to 1.0 Mass %

Mn is an element necessary to improve hot workability. However, in the case that the Mn content is less than 0.005 mass %, it is not possible to sufficiently realize such an effect. On the other hand, in the case that the Mn content is more than 1.0 mass %, there is a deterioration in magnetic flux density. Therefore, it is preferable that the Mn content is 0.005 mass % to 1.0 mass %.

(Inhibitor Constituents)

In the present disclosed embodiments, it is sufficient that a slab for a grain-oriented electrical steel sheet has a chemical composition with which secondary recrystallization occurs. In the case that an inhibitor is used to allow secondary recrystallization to occur, for example, it is sufficient that Al and N are appropriately added when an AlN-based inhibitor is used and that Mn and Se and/or S are appropriately added when a MnS—MnSe-based inhibitor is used. It is needless to say that both kinds of inhibitors may be used. In this case, the preferable content of each of Al, N, S, and Se is as follows.

Al: 0.010 mass % to 0.065 mass %
N: 0.0050 mass % to 0.0120 mass %
S: 0.005 mass % to 0.030 mass %
Se: 0.005 mass % to 0.030 mass %

Moreover, the present disclosed embodiments may be applied to a grain-oriented electrical steel sheet that does not use an inhibitor where the content of Al, N, S, or Se is limited. In this case, it is preferable that the content of each of Al, N, S, and Se be limited as follows.

Al: 0.010 mass % or less
N: 0.0050 mass % or less
S: 0.0050 mass % or less
Se: 0.0050 mass % or less In addition to the basic constituents and the inhibitor constituents, the optional constituents described below, which are known to be effective for improving magnetic properties, may be appropriately added.

One or more selected from Ni: 0.03 mass % to 1.50 mass %,
Sn: 0.01 mass % to 1.50 mass %,
Sb: 0.005 mass % to 1.50 mass %,
Cu: 0.03 mass % to 3.0 mass %,
P: 0.03 mass % to 0.50 mass %,
Mo: 0.005 mass % to 0.10 mass %, and
Cr: 0.03 mass % to 1.50 mass %

Ni is an element effective for improving magnetic properties by improving the microstructure of a hot rolled steel sheet. However, in the case that the Ni content is less than 0.03 mass %, contribution to an improvement in magnetic properties is small. On the other hand, in the case that the Ni content is more than 1.50 mass %, since secondary recrystallization is unstable, there is a deterioration in magnetic properties. Therefore, it is preferable that the Ni content is 0.03 mass % to 1.50 mass %.

In addition, Sn, Sb, Cu, P, Mo, and Cr are also elements that improve magnetic properties. However, in the case that the content of each of such elements is less than the corresponding lower limit described above, such an effect is insufficient. In addition, in the case that the content of each of such elements is more than the corresponding upper limit described above, since grain growth in secondary recrystallization is suppressed, there is a deterioration in magnetic properties. Therefore, it is preferable that the content of each of such elements is within the range described above.

In addition, the remainder which is different from the constituents described above is Fe and incidental impurities. Here, in a product steel sheet, the contents of the basic constituents and the optional constituents other than C in a steel material (slab) are maintained. On the other hand, there is a decrease in the C content due to decarburization annealing. In addition, since there is a decrease in the contents of the inhibitor constituents in final annealing described below, the contents of the inhibitor constituents in a product steel sheet are at a level of incidental impurities.

After having performed hot rolling on a steel material (slab) for a grain-oriented electrical steel sheet having the chemical composition described above, hot-rolled-sheet annealing is performed. Subsequently, cold rolling is performed once, optionally twice or more with intermediate annealing between periods that cold rolling is performed, to obtain a steel strip having the final thickness.

Subsequently, after having performed decarburization annealing on the steel strip, coating of an annealing separator containing mainly MgO to the annealed steel strip, the steel strip is wound into a coil. Thereafter, a final annealing is performed for the purpose of the secondary recrystallization and the formation of a forsterite coating film. After having performed flattening annealing on the steel strip that had been subjected to final annealing, a magnesium phosphate-based tension coating is formed to obtain a product steel strip.

In the present disclosed embodiments, in an appropriately selected process after cold rolling and before an annealing separator coating, linear grooves are formed on the surface of a grain-oriented electrical steel sheet (steel strip).

[Groove Dimensions]

Hereafter, preferable groove dimensions of the grooves formed according to the present disclosed embodiments will be described. Here, the meaning of the expression "groove dimensions" includes not only a groove width and a groove depth but also a groove interval between grooves formed cyclically in the rolling direction of a grain-oriented electrical steel sheet (steel strip) and an angle formed by the longitudinal direction of the linear grooves and the sheet transverse direction.

Groove Width: 1 μm to 100 μm

The groove width of the linear grooves corresponds to the width in the rolling direction of a portion from which a coated resist has been removed (portion which has been irradiated with a laser beam) in a resist pattern. In addition, the width of the portion from which a coated resist has been removed corresponds to the spot diameter of the laser beam used for removing the coated resist. Therefore, the groove width is about 1 μm to 100 μm.

Groove Depth: 4% to 25% of Sheet Thickness

The effect of improving iron loss due to formation of grooves increases with an increase in the surface area of the side walls of the grooves, that is, an increase in the formed depth of the groove (groove depth). Therefore, it is preferable that a groove having a depth of 4% or more of the sheet thickness is formed. On the other hand, it is needless to say that, in the case that there is an increase in groove depth, there is an increase in groove volume, which results in a deterioration in magnetic permeability. Moreover, there is a risk of the groove becoming a starting point at which fracturing occurs at the time of sheet passage. Therefore, it is preferable that the upper limit of the groove depth is 25% of the sheet thickness.

Linear Groove Forming Interval: 1.5 mm to 10 mm

As described above, since the effect of improving iron loss increases with an increase in the surface area of the side walls of grooves, the effect increases with a decrease in the linear groove forming interval. However, in the case that there is a decrease in the linear groove forming interval, since there is an increase in the volume fraction of grooves with respect to steel sheet volume, there is a deterioration in magnetic permeability. Further, there is an increased risk of fracturing occurring in operation. Therefore, it is preferable that the linear groove forming interval is 1.5 mm to 10 mm. Here, the expression "linear groove forming interval" denotes the distance in the rolling direction between linear grooves.

Angle Formed by Longitudinal Direction of Linear Grooves and Sheet Transverse Direction: Within a Range of ±30°

In the case that there is an increase in the absolute value of an angle formed by the longitudinal direction of linear grooves and the sheet transverse direction, since there is an increase in the groove volume, there is a tendency for magnetic permeability to be deteriorated. Therefore, it is preferable that the angle formed by the longitudinal direction of linear grooves and the sheet transverse direction is within a range of ±30°.

[Laser Spot Diameter Φ]

The expression "laser spot diameter Φ" denotes the full-width at half maximum in a strength profile obtained by using a slit method with a slit having a width of 30 μm.

EXAMPLES

Hereafter, the present disclosure will be described in detail in accordance with examples. The examples below are preferable examples of the present disclosure, and the present disclosure is not limited to the examples at all. The present disclosure may be performed by appropriately making alterations within a range in accordance with the intent of the present disclosure, and working examples performed in such a way are all within the technical scope of the present disclosure.

Figure 7:
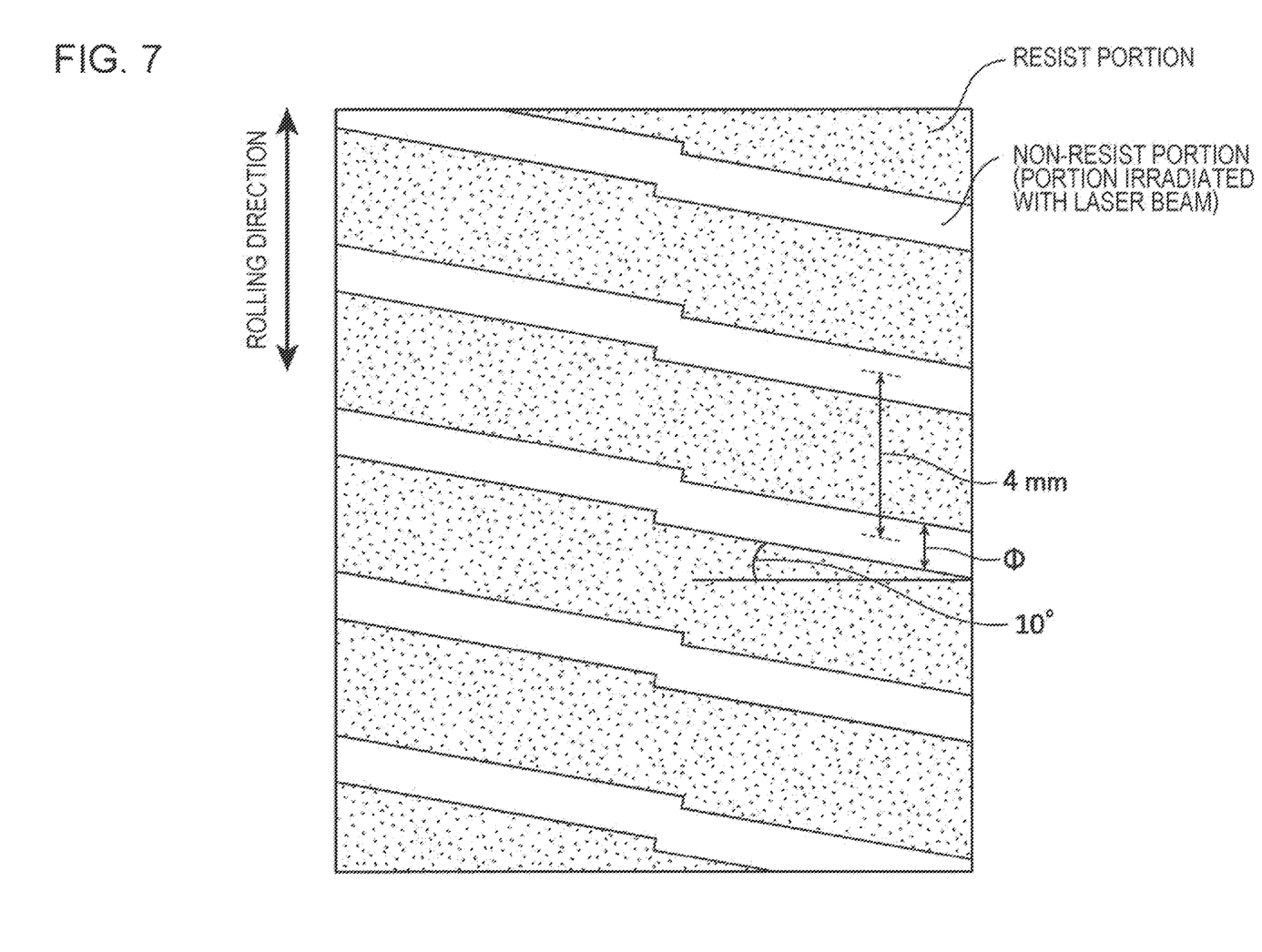
FIG. 7 is a diagram illustrating one example of a resist pattern formed in EXAMPLES.

After having performed hot rolling on each of the steel materials (slabs) for grain-oriented electrical steel sheets having the chemical compositions given in Table 2 with Fe and incidental impurities, hot-rolled-sheet annealing was performed. Subsequently, cold rolling was performed twice with intermediate annealing between the periods that cold rolling was performed to obtain a cold rolled steel strip having a thickness of 0.23 mm. After having formed a coated resist by coating a resist ink across the whole surface of such a cold rolled steel strip, removal of the coated resist was performed by using two laser beams irradiated from two laser irradiation devices arranged in the strip transverse direction. At this time, as illustrated in FIG. 7, laser beams were irradiated to form a resist pattern such that the groove interval in the rolling direction was 4 mm and an angle formed by the longitudinal direction of the grooves and the strip transverse direction was 10°. At this time, the amount of laser deflection was controlled so that overlapped portion of portions irradiated with the laser beams were arranged in the rolling direction. Further, a resist pattern was formed the steel strip such that the light path shift ratio, the light path overlap length c, the irradiation energy, and the spot diameter Φ varied successively. In addition, the electroetching condition was set so that the groove depth was 20 μm (with exception of regions where a melted portion was formed). After stripping the resist ink remaining on the surface of the steel strip, on which the linear grooves were formed, in an alkaline solution, decarburization annealing is performed, an annealing separator containing mainly MgO is coated on the steel strip, the steel strip was wounded into a coil, and final annealing was performed. After flattening annealing was performed on the steel strip which had been subjected to the final annealing, a magnesium phosphate-based tension coating was formed on the steel strip surface to obtain a final product steel strip.

TABLE 2

| Chemical Composition (mass %) | | | | | | | |
|---|---|---|---|---|---|---|---|
| C | Si | Mn | Al | N | Se | S | O |
| 0.08 | 3.0 | 0.1 | 0.0260 | 0.007 | 0.0110 | 0.003 | 0.0025 |

Samples having an RD length of 280 mm and a TD length of 100 mm were taken from the obtained steel strip such that each linear groove 1 contained one discontinuous portion of center lines, that is, such that each of the samples contains discontinuous portion of center lines. Further, $W_{17/50}$ and $B_8$ were determined by using a single sheet test (SST) method. Here, "RD" denotes the steel sheet rolling direction, and "TD" denotes the sheet transverse direction.

In addition, for comparison, samples were prepared by performing the same processes as described above with the exception that a resist pattern was formed by using a gravure printing method or an ink-jet printing method, and $W_{17/50}$ and $B_8$ were determined. Here, the width of the grooves formed by using a gravure printing method or an ink-jet printing method was 50 μm.

The results are collectively given in Table 3. It was clarified that, in the case that the light path shift ratio was within the range of the present disclosed embodiments, it was possible to realize a larger effect of improving iron loss than in the case that the same resist pattern was formed by using other methods. In addition, it was clarified that, in the case that the light path overlap length c was 50 mm or less, it was possible to realize an even larger effect of improving iron loss. Moreover, it was clarified that, in the case that the conditions applied for laser irradiation was within the preferable ranges, it was possible to realize an even much larger effect of improving iron loss.

TABLE 3

| No. | Light Path Shift Ratio | Light Path Overlap Length c [mm] | Spot Diameter $\Phi$ [μm] | Irradiation Energy [J/m] | Resist Pattern Forming Method | Iron Loss $W_{17/50}$ [W/kg] | $B_8$ [T] | Note |
|---|---|---|---|---|---|---|---|---|
| 1 | 0 | 0 | 50 | 20 | Resist Peeling Method | 0.710 | 1.930 | Comparative Example |
| 2 | 0.05 | 0 | 50 | 20 | Resist Peeling Method | 0.690 | 1.930 | Example |
| 3 | 0.1 | 0 | 50 | 20 | Resist Peeling Method | 0.685 | 1.930 | Example |
| 4 | 0.5 | 0 | 50 | 20 | Resist Peeling Method | 0.685 | 1.930 | Example |
| 5 | 0.9 | 0 | 50 | 20 | Resist Peeling Method | 0.685 | 1.930 | Example |
| 6 | 0.95 | 0 | 50 | 20 | Resist Peeling Method | 0.690 | 1.930 | Example |
| 7 | 1.0 | 0 | 50 | 20 | Resist Peeling Method | 0.690 | 1.920 | Comparative Example |
| 8 | 0 | 0.1 | 50 | 20 | Resist Peeling Method | 0.700 | 1.930 | Comparative Example |
| 9 | 0.05 | 0.1 | 50 | 20 | Resist Peeling Method | 0.685 | 1.930 | Example |
| 10 | 0.1 | 0.1 | 50 | 20 | Resist Peeling Method | 0.680 | 1.930 | Example |
| 11 | 0.5 | 0.1 | 50 | 20 | Resist Peeling Method | 0.680 | 1.930 | Example |
| 12 | 0.9 | 0.1 | 50 | 20 | Resist Peeling Method | 0.680 | 1.930 | Example |
| 13 | 0.95 | 0.1 | 50 | 20 | Resist Peeling Method | 0.685 | 1.930 | Example |
| 14 | 1.0 | 0.1 | 50 | 20 | Resist Peeling Method | 0.685 | 1.920 | Comparative Example |
| 15 | 0 | 10 | 50 | 20 | Resist Peeling Method | 0.700 | 1.930 | Comparative Example |
| 16 | 0.05 | 10 | 50 | 20 | Resist Peeling Method | 0.685 | 1.930 | Example |
| 17 | 0.1 | 10 | 50 | 20 | Resist Peeling Method | 0.680 | 1.930 | Example |
| 18 | 0.5 | 10 | 50 | 20 | Resist Peeling Method | 0.680 | 1.930 | Example |
| 19 | 0.9 | 10 | 50 | 20 | Resist Peeling Method | 0.680 | 1.930 | Example |
| 20 | 0.95 | 10 | 50 | 20 | Resist Peeling Method | 0.685 | 1.930 | Example |
| 21 | 1.0 | 10 | 50 | 20 | Resist Peeling Method | 0.685 | 1.920 | Comparative Example |
| 22 | 0 | 40 | 50 | 20 | Resist Peeling Method | 0.700 | 1.930 | Comparative Example |
| 23 | 0.05 | 40 | 50 | 20 | Resist Peeling Method | 0.685 | 1.930 | Example |
| 24 | 0.1 | 40 | 50 | 20 | Resist Peeling Method | 0.680 | 1.930 | Example |
| 25 | 0.5 | 40 | 50 | 20 | Resist Peeling Method | 0.680 | 1.930 | Example |
| 26 | 0.9 | 40 | 50 | 20 | Resist Peeling Method | 0.680 | 1.930 | Example |
| 27 | 0.95 | 40 | 50 | 20 | Resist Peeling Method | 0.685 | 1.930 | Example |
| 28 | 1.0 | 40 | 50 | 20 | Resist Peeling Method | 0.685 | 1.920 | Comparative Example |
| 29 | 0 | 50 | 50 | 20 | Resist Peeling Method | 0.710 | 1.930 | Comparative Example |
| 30 | 0.05 | 50 | 50 | 20 | Resist Peeling Method | 0.690 | 1.930 | Example |
| 31 | 0.1 | 50 | 50 | 20 | Resist Peeling Method | 0.685 | 1.930 | Example |
| 32 | 0.5 | 50 | 50 | 20 | Resist Peeling Method | 0.685 | 1.930 | Example |
| 33 | 0.9 | 50 | 50 | 20 | Resist Peeling Method | 0.685 | 1.930 | Example |
| 34 | 0.95 | 50 | 50 | 20 | Resist Peeling Method | 0.690 | 1.930 | Example |
| 35 | 1.0 | 50 | 50 | 20 | Resist Peeling Method | 0.690 | 1.920 | Comparative Example |
| 36 | 0 | 60 | 50 | 20 | Resist Peeling Method | 0.710 | 1.925 | Comparative Example |
| 37 | 0.05 | 60 | 50 | 20 | Resist Peeling Method | 0.695 | 1.925 | Example |
| 38 | 0.1 | 60 | 50 | 20 | Resist Peeling Method | 0.690 | 1.925 | Example |
| 39 | 0.5 | 60 | 50 | 20 | Resist Peeling Method | 0.690 | 1.925 | Example |
| 40 | 0.9 | 60 | 50 | 20 | Resist Peeling Method | 0.690 | 1.925 | Example |
| 41 | 0.95 | 60 | 50 | 20 | Resist Peeling Method | 0.695 | 1.925 | Example |
| 42 | 1.0 | 60 | 50 | 20 | Resist Peeling Method | 0.695 | 1.910 | Comparative Example |
| 43 | 0.1 | 10 | 0.5 | 20 | Resist Peeling Method | 0.690 | 1.925 | Example |
| 44 | 0.5 | 10 | 110 | 20 | Resist Peeling Method | 0.690 | 1.930 | Example |
| 45 | 0.1 | 10 | 50 | 0.5 | Resist Peeling Method | 0.690 | 1.930 | Example |
| 46 | 0.5 | 10 | 50 | 35 | Resist Peeling Method | 0.690 | 1.925 | Example |
| 47 | 0.1*[1] | 10*[2] | — | — | Gravure Printing Method | 0.710 | 1.920 | Comparative Example |
| 48 | 0.5*[1] | 10*[2] | — | — | Gravure Printing Method | 0.710 | 1.920 | Comparative Example |
| 49 | 0.1*[1] | 10*[2] | — | — | Ink-jet Printing Method | 0.700 | 1.930 | Comparative Example |
| 50 | 0.5*[1] | 10*[2] | — | — | Ink-jet Printing Method | 0.700 | 1.930 | Comparative Example |

Underlined items indicate items out of the ranges of the present disclosed embodiments.

*[1](shift distance between the center lines in the discontinuous portion of center lines of the formed grooves)/(groove width), which corresponds to the light path shift ratio

*[2]the length of the discontinuous portion of center lines of the formed grooves, which corresponds to the light path overlap length c

The invention claimed is:

1. A linear groove formation method comprising:
   forming a coated resist on a surface of a steel sheet,
   irradiating two or more laser beams onto the surface of the steel sheet while scanning the two or more laser beams in a direction intersecting an rolling direction of the steel sheet cyclically in the rolling direction of the steel sheet to remove the coated resist from portions irradiated with the two or more laser beams, and
   forming linear grooves by etching portions of the steel sheet from which the coated resist has been removed,
   wherein, in the irradiating:
   the coated resist is removed continuously in a sheet transverse direction of the steel sheet by the two or more laser beams irradiated from respective ones of two or more laser irradiation devices arranged in the sheet transverse direction; and
   when a spot diameter of the two or more laser beams is defined as $\Phi$, the two or more laser beams are irradiated by shifting centers of two of the two or more laser beams irradiated from two of the two or more laser irradiation devices adjacent to each other in the sheet transverse direction by $\Phi$ multiplied by 0.05 or more and 0.95 or less in a direction perpendicular to a laser scanning direction on the surface of the steel sheet.

2. The linear groove formation method according to claim 1, wherein a length in the laser scanning direction of an overlapped portion of portions irradiated with the two of the two or more laser beams is 50 mm or less.

3. The linear groove formation method according to claim 1, wherein the spot diameter $\Phi$ of the two or more laser beams is 1 μm or more and 100 μm or less, and an irradiation energy of the two or more laser beams is 1 J/m or more and 30 J/m or less.

4. The linear groove formation method according to claim 1, wherein the steel sheet is a grain-oriented electrical steel sheet.

5. The linear groove formation method according to claim 2, wherein the spot diameter $\Phi$ of the two or more laser beams is 1 μm or more and 100 μm or less, and an irradiation energy of the two or more laser beams is 1 J/m or more and 30 J/m or less.

6. The linear groove formation method according to claim 2, wherein the steel sheet is a grain-oriented electrical steel sheet.

7. The linear groove formation method according to claim 3, wherein the steel sheet is a grain-oriented electrical steel sheet.

8. The linear groove formation method according to claim 5, wherein the steel sheet is a grain-oriented electrical steel sheet.

* * * * *